Nov. 29, 1927.
J. S. SAWYERS
1,651,043
CLOD CRUSHING AND SOIL PULVERIZING ATTACHMENT FOR AGRICULTURAL MACHINES
Filed Jan. 24, 1927
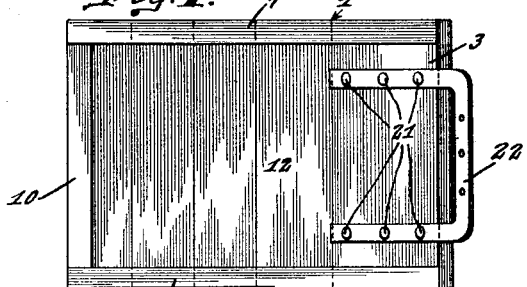
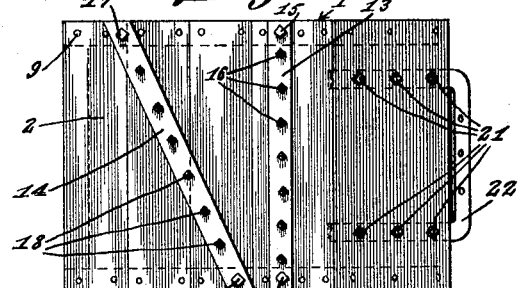
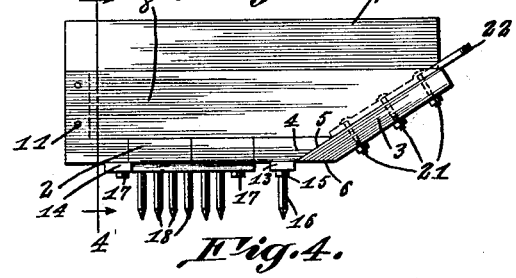
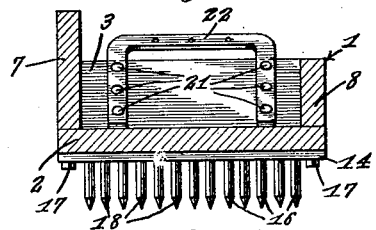
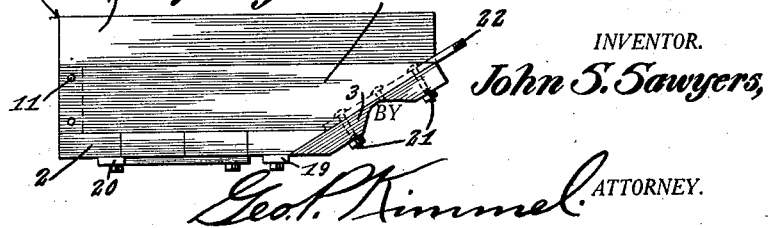
INVENTOR.
John S. Sawyers,
BY
Geo. P. Kimmel ATTORNEY.

Patented Nov. 29, 1927.

1,651,043

UNITED STATES PATENT OFFICE.

JOHN S. SAWYERS, OF GLENWOOD, IOWA.

CLOD-CRUSHING AND SOIL-PULVERIZING ATTACHMENT FOR AGRICULTURAL MACHINES.

Application filed January 24, 1927. Serial No. 163,185.

This invention relates to a clod crushing and soil pulverizing attachment for agricultural machines, such as plows and planters of any type with which the attachment can be employed, and the invention has for its object to provide, in a manner as hereinafter set forth, an inexpensive, strong, durable, compact attachment of comparatively simple construction for use in connection with any type of agricultural machine with which it is found applicable for crushing clods and pulverizing the soil in a thoroughly efficient manner.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of an attachment, in accordance with this invention.

Figure 2 is an inverted plan thereof.

Figure 3 is a side elevation.

Figure 4 is a section on line 4—4, Figure 3.

Figure 5 is a side elevation with the teeth removed.

An attachment, for the purpose set forth and in accordance with this invention, is of a compartment form, constructed of any suitable material, of any suitable length or width, and includes a plurality of crushing and pulverizing elements as shown by way of example two in number.

The attachment comprises a base referred to generally by the reference character 1 and formed of a horizontally disposed rectangular portion 2 and an upstanding and forwardly inclined front portion 3 extending from the forward terminus of the portion 2. The base 1 can be constructed of any suitable material and is shown by way of example with the portion 2 constructed from a series of abutting wooden slabs and the portion 3 of a single slab of wood. The forward slab 4 of the portion 2 has its front edge bevelled, as at 3, and abutting against the same, as well as extending upwardly therefrom is the slab which constitutes the portion 3. The lower edge of the slab, which constitutes the portion 3, is bevelled, as at 6, so it will extend in the same plane as the plane of the lower face of the portion 2. Seated upon the upper face of the base 1 and flush with the lengthwise edges thereof is a pair of upstanding side members 7, 8, which extend from the rear edge of the base 1 and terminate at the upper corner of the forward edge of the portion 3. Each of the side members 7 and 8 has the lower part thereof, at the forward portion thereof, cut away for the purpose of seating upon the inclined portion 3 of the base. The side member 7 is of greater height than the side member 8. The side members 7 and 8 are connected to the base 1 by hold-fast devices 9.

Arranged between the side members 7 and 8, at the rear thereof, and positioned in alignment with the rear edge of the base 1, is an upstanding back member 10 of the same height as the height of the side member 8. The back member 10 is secured to the side members 7 and 8 by the hold-fast devices 11. The base 1, in connection with the side members 7 and 8 and back member 10, provides a compartment 12 having its front closed by the upwardly inclined portion 3 of the base 1.

Secured to the lower face of the portion 2, of the base 1, is a plurality of clod crushing and soil pulverizing elements and as shown in Figure 2, each of said elements consists of a bar carrying a row of spaced teeth, and as shown in Figure 5, each of said elements consists of a bar without the teeth.

The clod crushing and soil pulverizing elements shown in Figure 2 are indicated at 13 and 14. The element 13 extends transversely of the portion 2 in proximity to the forward end thereof and is secured in position by the hold-fast devices 15. The teeth of the element 13 are indicated at 16. The element 14 extends diagonally with respect to the lower face of the portion 2, is arranged rearwardly of the element 13 and secured in position by the hold-fast devices 17. The teeth of the element 14 are indicated at 18 and are so disposed with respect to the teeth 16 as to be positioned in a plane arranged centrally between the teeth 16.

The clod crushing and soil pulverizing elements shown in Figure 5 are indicated at 19 and 20 and are arranged against the lower face of the portion 2 of the base 1 in the same manner as the elements 13 and 14 are positioned.

Secured to the inner face of the portion 3 of the base 1, by the hold-fast devices 21, is a yoke-shaped member 22 for connecting the attachment to the agricultural machine with which it is used.

When the attachment is used with an agricultural machine other than a plow, the side members 7 and 8 are preferably of the same height, but when employed in connection with a plow the side member 7 is of greater height than the side member 8.

An attachment, in accordance with this invention, provides for efficiently crushing clods and pulverizing the soil, or in other words it provides means to crush the clods, harrow, float and pulverize the soil at the same time when the attachment is pulled over the soil, and it is thought the many advantages of the attachment as illustrated and described, can be thoroughly understood, but although the preferred embodiment of the invention is as shown, yet it is to be understood that changes in the details of construction can be had which will fall within the scope of the invention as claimed.

What I claim is:—

1. An attachment for the purpose set forth comprising a base having a flat rear portion and an upwardly inclined forward portion, a pair of spaced side members secured to the upper face of said base and extending from the front to the rear thereof, a back member secured to the upper face of the base and arranged between the rear ends of said side members, said members in connection with said base forming a compartment and having its bottom throughout provided by the base, and a plurality of clod crushing and pulverizing elements secured to the lower face of the flat portion of the base, said elements arranged one in advance of the other, one of said elements extending transversely of the base and from side to side thereof, and the other of said elements extending diagonally of the base and from side to side thereof, said elements arranged in spaced relation.

2. An attachment for the purpose set forth comprising a base having a flat rear portion and an upwardly inclined forward portion, a pair of spaced side members secured to the upper face of said base and extending from the front to the rear thereof, a back member secured to the upper face of the base and arranged between the rear ends of said side members, said members in connection with said base forming a compartment and having its bottom throughout provided by the base, a plurality of clod crushing and pulverizing elements secured to the lower face of the flat portion of the base, said elements arranged one in advance of the other, one of said elements extending transversely of the base and from side to side thereof, and the other of said elements extending diagonally of the base and from side to side thereof, said elements arranged in spaced relation, each of said elements including a row of depending teeth, the teeth of said elements staggered with respect to each other.

3. An attachment for the purpose set forth comprising a base having a flat rear portion and an upwardly inclined forward portion, a pair of spaced side members secured to the upper face of said base and extending from the front to the rear thereof, a back member secured to the upper face of the base and arranged between the rear ends of said side members, said members in connection with said base forming a compartment and having its bottom throughout provided by the base, a plurality of clod crushing and pulverizing elements secured to the lower face of the flat portion of the base, said elements arranged one in advance of the other, one of said elements extending transversely of the base and from side to side thereof, and the other of said elements extending diagonally of the base and from side to side thereof, said elements arranged in spaced relation, and a yoke shaped member secured to the upper face of the inclined portion of said base and extended forwardly therefrom.

4. An attachment for the purpose set forth comprising a base having a flat rear portion and upwardly inclined forward portions, a pair of spaced side members secured to the upper face of the base and extending from front to rear thereof, a back member secured to the upper face of the base at the rear end thereof and forming in connection with said side members and said base a compartment having its bottom provided throughout by the base a clod crushing and pulverizing element extending transversely of the lower face of the flat portion of the base at the forward end of said flat portion and extending from one side to the other side of the base, and a clod crushing and pulverizing element secured to the lower face of the flat portion of the base, rearwardly of the first mentioned clod crushing and pulverizing element and disposed diagonally and further extending from one side to the other side of the flat portion of the base.

5. An attachment for the purpose set forth comprising a base having a flat rear portion and upwardly inclined forward portions, a pair of spaced side members secured to the upper face of the base and extending from front to rear thereof, a back member secured to the upper face of the base at the rear end thereof, and forming in connection with said side members and said base a compartment having its bottom provided throughout by the base, a clod crushing and pulverizing element extending transversely of the lower face of the flat portion of the base at the forward end of said flat portion and extending from one side to the other side of the base, a clod crushing and pulverizing element secured to the lower face of the flat portion of the base, rearwardly of the first mentioned clod crushing and pulverizing element and disposed diagonally and further extending from one side to the other side of the flat portion of the base, and a yoke shaped member secured to the upper face of the inclined portion of the base and projecting forwardly from the latter.

In testimony whereof, I affix my signature hereto.

JOHN S. SAWYERS.